United States Patent
Eastham et al.

[11] Patent Number: 5,175,943
[45] Date of Patent: Jan. 5, 1993

[54] SOLIDS FEED SYSTEM AND METHOD FOR FEEDING FLUIDIZED BEDS

[75] Inventors: Donald H. Eastham, Bay St. Louis, Miss.; James W. Reeves, Wilmington, Del.

[73] Assignee: E. I. Du Pont de Nemours and Company, Wilmington, Del.

[21] Appl. No.: 527,738

[22] Filed: May 23, 1990

[51] Int. Cl.⁵ .................................................. F26B 17/00
[52] U.S. Cl. .................................... 34/57 A; 110/106; 110/245
[58] Field of Search ............... 110/245, 106; 34/57 A; 432/58, 15

[56] References Cited

U.S. PATENT DOCUMENTS

| | | | |
|---|---|---|---|
| 3,951,081 | 4/1976 | Martin et al. | 110/106 |
| 4,059,060 | 11/1977 | Gambs | 110/106 |
| 4,332,207 | 6/1982 | Blaskowski et al. | 110/106 |
| 4,349,331 | 9/1982 | Floter | 110/106 |
| 4,387,654 | 6/1983 | Binasik et al. | 110/106 |
| 4,419,941 | 12/1983 | Santalla | 110/106 |
| 4,707,350 | 11/1987 | Bandequin et al. | 34/57 A |
| 4,716,856 | 1/1988 | Beisswenger et al. | 110/245 |

*Primary Examiner*—Henry C. Yuen
*Attorney, Agent, or Firm*—David J. Gould

[57] ABSTRACT

The invention provides an improved method and apparatus for feeding solids to a fluidized bed reactor. A back pressure control valve regulates the pressure drop between the pressure above a solids column in a standpipe and the pressure in the reactor. Solids are fed from the standpipe via a conduit without valve means, the conduit contains a bend of an angle greater than the angle of repose of the solids.

4 Claims, 1 Drawing Sheet

SOLIDS FEED SYSTEM AND METHOD FOR FEEDING FLUIDIZED BEDS

BACKGROUND OF THE INVENTION

This invention relates to an improved fluidized bed system and process therefor.

Fluidized bed processes are used commercially for the ore roasting or refining (such as chlorination of titanium containing materials) combustion of solid carbonaceous material such as coal, hydrocarbon conversion processes (e.g., fluid catalytic cracking), etc.

In such processes, particulate material and gas are fed to a reactor where suitable temperatures and pressures are maintained. The flow rates are adjusted so that the particulate material becomes fluidized, i.e., it is maintained in a state of suspension and has the appearance of boiling.

A good example of a commercial fluidized bed process is that employed for chlorinating titanium containing material. In such processes, particulate coke, particulate titanium containing material, chlorine, and optionally oxygen or air are fed into a reactor at suitable reaction temperature and pressure. Suitable gas flow rates sustain bed fluidization. Gaseous titanium tetrachloride and other metal chlorides are produced and exit the reactor. The titanium tetrachloride can then be separated and used to produce titanium dioxide pigment or titanium metal.

U.S. Pat. No. 2,701,179 discloses a commercial fluidized bed process for chlorinating titanium containing material wherein the particulates are heated by direct contact with reaction product gases, separated in a cyclone and subsequently fed pneumatically with chlorine into the bottom of the fluidized bed reactor.

A problem, however, which has not been solved in the foregoing fluidized bed processes, is that fine particulate material tends to become entrained in the hot gases discharged from the fluidized bed reactor. As a consequence, fine particulates have a short residence time in the reactor and tend to exit unreacted, even when they are recycled. The unreacted fines, therefore, represent not only a disposal problem but also a waste of fuel and/or metallic values in the feed materials.

The fine particles typically are present due to the attrition and degradation of larger feed particles. However, it is also desirable to include fine particulate material in the feed to the process since such materials are often abundant and less expensive than material of larger particle size. For example, there are large quantities of relatively inexpensive titanium containing ore which cannot presently be economically processed because they exist as fine grained sand. For example, the article entitled "Fluidized Bed Chlorination of Rutile" by J. Glasser and W. L. Robinson appeared in the September 9, 1962 publication of the Society of Mining Engineers of AIME, describes a commercial fluidized bed process for chlorinating titanium ore wherein the ore fed to the top of the fluidized bed reactor is of a particle size greater than about 70 microns.

There are several procedures disclosed in the prior art for controlling the flow of solids into fluidized beds. For example, U.S. Pat. No. 4,774,299 discloses a system and process for introducing catalytic powder into a fluidized bed polymerization reactor comprising: (1) a storage vessel for the powder, provided with a feed line and a shut-off valve, (2) a metering device for delivery of powder to an intermediate chamber below it, the chamber having a tube and shut-off valve in its upper part to introduce an inert carrier gas, and (3) conveyor piping having an elbow or bend, a horizontal or substantially horizontal portion and a rapid-opening valve to convey the metered powder to a fluidized-bed reactor. The purpose of the intermediate chamber is to reduce the compactness of the catalyst powder. The catalyst powder can have a mean diameter by mass of between 100 and 400 microns.

U.S. Pat. No. 3,850,582 describes an apparatus for adding fresh make-up catalyst to a process unit, e.g., a fluidized catalytic cracking unit. The apparatus comprises: (a) a main fresh catalyst hopper; (b) a catalyst metering hopper, which is essentially a vertical standpipe, containing a fluidized bed of catalyst; (c) a catalyst transfer line connecting the main hopper to the metering hopper; (d) a valve to control withdrawal of catalyst from the metering hopper for transfer to the process unit; and (e) means for measuring and recording the pressure differential across the catalyst fluid bed in the metering hopper, to monitor the rate of addition of catalyst to the process unit.

The catalyst hopper is provided with a cyclone separator from which the gas separated from solids is passed via a conduit to the main catalyst hopper. Pressure corrections for the pressure drop across the valve controlling catalyst withdrawal from the metering hopper is performed by opening and closing a valve in a vent line from the main catalyst hopper.

U.S. Pat. No. 3,105,736 discloses an improved method of feeding particulate solids into a reactor producing effluent gases whereby these gases are prevented from penetrating the feeding system. The method applies particularly to the preparation of metal halides, e.g., $TiCl_4$, where particulate metal ore and coke are reacted in a fluidized bed with halogen gas. The improvement comprises establishing a pair of fluidized beds of the feed material which are connected below the beds. Both of these beds are fluidized with inert gas. The upper surface of the first bed is open to the solids feed, and that of the second bed communicates directly with the reactor. Feeding material to the first bed causes material to flow into the second bed and from there into the reactor. The gas pressure in the second bed is maintained above the reactor pressure, preventing reaction effluent gases from penetrating the feed system.

U.S. Pat. No. 2,905,635 discloses a method for hydrocarbon conversion in presence of a fluidized catalyst, which comprises: (a) mixing hydrocarbons and catalyst; (b) conveying this mixture through a transfer pipe into a fluidized bed reactor; (c) reacting the hydrocarbon, and removing spent catalyst into a transfer pipe below the reactor; (d) withdrawing spent catalyst through a valve into a dense phase fluidized bed in a vertical standpipe; (e) removing spent catalyst through a valve at the bottom of the standpipe, and transporting it with gas to a regenerator; (f) withdrawing regenerated catalyst, through a valve below the regenerator, into a dense phase fluidized bed in a vertical standpipe; and (g) removing regenerated catalyst through a valve at the bottom of the standpipe to be mixed with hydrocarbons in step (a).

The flow of catalyst into and out of the reactor and standpipes is controlled with valves connected to differential pressure controllers. The differential pressure controllers measure the pressures across the valves which change with the bed levels above the valves.

U.S. Pat. No. 2,892,773 describes a cyclical fluidized bed process and apparatus in which fluidized solid particles, suspended in a first reaction gas in a dense phase, are circulated continuously from a hopper through a reaction vessel and back to the hopper where the first reaction gas is separated from the solid particles. Fluidized solid particles are cycled between the hopper and a second reaction vessel, in which the particles are suspended in a second reaction gas. Particle cycling is performed by the use of pressure regulating valves, together with a differential pressure controller and a timer, to change periodically the direction of the pressure difference between the hopper and the second reaction vessel.

For example, a gas exit line with a pressure control valve communicates with the second reaction vessel via a separator. The timer actuates the valve which increases the pressure in the second reaction vessel ultimately changing the direction of the pressure differential between the first and second reaction vessels. The change in pressure differential causes the timer to open a slide valve thereby permitting particles to travel from the second reaction vessel to the first via a transfer line.

U.S. Pat. No. 2,881,133 describes a system in which particulate solids are circulated between two or more different fluid-bed treating zones, and no mixing between the gases in the different zones is permissible. The system is characterized by the following features: (a) a vertical fluidized solids standpipe section which provides a pressure buildup; (b) a sharp bend at the bottom of the standpipe; (c) a slanted riser side sloped at about 60 degrees from the horizontal; (d) a large radius bend connecting the slanted riser with a vertical riser; and (e) usually a vertical riser leading directly into a receiving vessel or into a transfer line sloping downward into such a vessel.

The combination of a vertical standpipe, a sharp bend, and a slanted riser as in (a),(b),(c) is sometimes called a J-bend. Fluidization is maintained in the J-bend by adding inert gas at several points.

SUMMARY OF THE INVENTION

An object of the invention is to provide a method and means for conducting a fluidized bed process which ameliorates the problems in the prior art regarding entrainment of fines, use of excessive amounts of inert gas for solids transportation, and/or inability to adjust operations for handling particles of irregular shape and/or size.

Upon further study of the specification and appended claims, further objects and advantages of this invention will become apparent to those skilled in the art.

The present invention is an improved system and method for continuously feeding particulate solids to a fluidized bed reactor. According to a method aspect, the invention comprises: (a) entraining solids in a flow of inert gas, at elevated pressure, in a line leading to a cyclone in which gas and solids are separated into two streams, an exit gas stream and a gravity stream of solids; (b) delivering said gravity stream of solids to an essentially vertical standpipe and delivering the exit gas stream to a vent line; (c) providing valve means within the vent line to control the pressure therein thereby controlling the effective hydrostatic head of a solids column in the standpipe; (d) fluidized solids in the standpipe by introducing a flow of gas at one or more locations in the standpipe; and (e) feeding solids, in a dense phase, from the standpipe directly to a fluidized bed reactor by a feed conduit without valve means, the conduit having a bend which is greater than the angle of repose of the particulate solids.

According to an apparatus aspect, the invention comprises: (a) a solids transport device for transporting solids with inert gas at elevated pressure; (b) a transport line for conveying inert gas and entrained solids, the transport line connecting the solids transport device to a cyclone wherein gas and solids are separated; (c) gas conduit means connected to the cyclone for removing gas; (d) solids discharge means connected to the cyclone for passing solids to an essentially vertical standpipe, and inlet means provided in the standpipe for introducing inert gas into the standpipe at one or more locations to fluidized solids; (e) valve means for controlling the pressure in the gas conduit means for removing gas thereby controlling the effective hydrostatic head of a solids column in the standpipe; and (f) a feed conduit without valve means connecting the standpipe to a fluidized bed reactor for feeding solids in a dense phase directly to the reactor, the feed conduit having a bend which is greater than the angle of repose of the particulate solids being transported.

According to another method aspect, the invention is directed to a process for obtaining titanium halides comprising introducing halogen gas into a reactor having a fluidized bed of particulate coke and titanium-containing ore where titanium halides are removed from the reactor as product gas, the improvement comprising feeding particulate coke and titanium-containing ore to the reactor in accordance with the above described process.

According to a further method aspect, the invention comprises a method of reducing the amount of inert gas used to convey solids to a fluidized bed reactor by at least 90 vol. %, comprising feeding solids to the reactor in accordance with the above described process.

DETAILED DESCRIPTION OF THE INVENTION

The concept of this invention can be used in any fluidized bed process, especially those which are susceptible to entrainment of fine particulate material in the gases exiting the bed. Examples of fluidized bed processes which can utilize the concept of this invention include combustion of carbonaceous material (such as coal, wood, peat, etc.), hydrocarbon conversion (e.g., fluid catalytic cracking), ore roasting or extraction (such as chlorination of titanium containing material and processing of metallic ores including those of zinc, copper, or iron), etc.

This invention relates to a system for feeding particulate solids, including mixtures, to a pressurized fluidized bed reactor that eliminates most of the large quantities of inert gas typically used to convey the feed materials to said reactor. Injection of typical amounts of inert gas either requires large equipment or limits the capacity of existing equipment as a result of the gas velocity or pressure drop limitations.

While batch addition of solids is possible by use of the invention, continuous solids addition is a preferred mode of operation.

In this invention, equipment, such as a screw device, commonly used to raise the pressure and transport solids, is employed to convey particulate feed solids to a line by which the solids are to be transported, in dilute phase (e.g., solids content less than 10 vol. %, preferably about 1 vol. %), with an inert carrier gas such as air or nitrogen. The device employed can be any conventional solids pump means which is capable of combining solids with a conveying gas.

The solids and conveying gas are transported to a cyclone where gas and solids are separated. The solids pass from the cyclone to a standpipe where they are fluidized by a small flow of inert gas, preferably at two locations.

The lower end of the standpipe connects with the reactor through a bend in the piping such as an "L" bend, "J" bend or "U" bend which act to restrict solids flow. An "L" bend is a 90° bend or substantially a 90° bend from the vertical. A "J" bend is a bend between 90° and 180° from the vertical, and a "U" bend is a 180° or substantially a 180° bend. The bend can also be less than 90° but should be greater than the angle of repose of the particulate material. These devices are commonly used to feed fluidized solids and they tend to minimize backflow of particulate material caused by excessive pressure in the reactor. The bend restricts solids flow solely by changing flow direction; it does not incorporate a valve means which regulates flow by adjusting the cross sectional area of the flow path.

Solids flow through the bend generally in a dense phase (e.g., solids content greater than 10 vol. %, preferably about 10-50 vol. %).

The gases leaving the cyclone are controlled, by a valve, so that a pressure is achieved which permits the standpipe to operate with a nominal solids level which would otherwise be excessive from an equipment standpoint. The back pressure control valve maintains a pressure in the standpipe which is slightly above that of the reactor to prevent backup of process material into the standpipe. The difference between the pressure at a point directly upstream of the control valve and the reactor pressure can be, for example, about 1-10 psi, preferably about 2-5 psi, and especially about 3.5 psi. The back pressure control valve is controlled by a differential pressure controller which is connected to pressure sensors within the reactor and upstream of the control valve.

U.S. Pat. No. 3,850,582 discloses using a control valve in the vent line of a main catalyst hopper to adjust the pressure drop across a cycle timed slide valve in the line connecting a catalyst metering hopper to a regenerator. The pressure drop across the valve provides for unidirectional flow from the metering hopper to the regenerator. In comparison, the invention employs the back pressure control valve to regulate the overall pressure drop from the region above the solids column in the standpipe to the reactor. No valve means (i.e., a device regulating cross sectional flow area) is employed in the invention between the standpipe and the reactor. Moreover, while batch operation is possible, the invention preferably operates with a continuous flow of solids through the standpipe and bend rather than intermittent flow.

The solids level in the standpipe is at a height necessary to overcome the frictional losses in the bend as well as the frictional losses in the piping from the bend to the reactor. These frictional losses can vary but it is preferred that they be kept as low as possible. Preferably, these frictional losses amount to about 2-3 psi in total. The solids level is thus preferably sufficient to overcome frictional losses of about 2-3 psi. The solids level will vary with density of material but preferably is in the range of 4-10 ft., especially 4-6 ft.

The back pressure control valve can be used to compensate for changes in physical properties of the solids in the standpipe, and thus control the effective hydrostatic head of the solids column. If the solids fail to fluidize properly, the control valve can be closed and all the solids conveyed into the reactor in a conventional manner, at a point below the surface of the fluidized bed. Preferably, solids are introduced into the reactor at or around the base of the fluidized bed. The combination of back pressure control valve and solids column is especially suitable for feeding solids to fluidized bed reactors operating at high pressures, e.g., about 20-30 psig.

Inert or reactant gases can be used to fluidize the solids in the standpipe. Thus, sufficient amounts of gas such as air, nitrogen, chlorine, etc. are injected into the particulate material in the standpipe to fluidize the material and lessen the binding of particles. Such gas can thereby help to control the flow rate of the particulate material. Ordinarily, such gas should be present in an amount of about 0.001-0.1, preferably about 0.0025-0.04, and most preferably about 0.005-0.02 part by weight of gas per part by weight of particulate material and have a superficial gas velocity of about 0.1-10, preferably about 0.5-5, and most preferably about 0.75-3 feet per second. It should be understood that the amount and velocity of such gas will depend upon the size, density, and shape of the particle, and density of the gas, and can readily be determined by testing. If such gas is acting as a lubricant or is used in conjunction with an "L" valve or pipe with a bend, preferably such gas should be injected at or near the bend.

The invention represents a substantial advantage regarding reducing the amount of conveying gas conventionally employed for feeding solids to a fluidized bed reactor. For example, the invention can be used to reduce the flow conveying gas into the reactor to less than 50 vol. %, preferably less than 10 vol. %, and especially less than 1 vol. % of the amount of conveying gas used in conventional processes.

The particle size of the material which can be conveyed in accordance with the invention can vary widely. For example, the invention can be used to feed solids having a particle size of about 1 microns-10 mm. The invention is especially suitable for conveying solids wherein about 10 wt % of the material is under 30 microns and the remainder is about 100 microns-8 mm.

The particle size of the particulate material which is susceptible to entrainment in the reactor can vary depending on its terminal settling velocity and the superficial velocity of gases in the fluidized bed. Generally, when the terminal settling velocity of a particle is less than that of the superficial velocity of gases in the bed, then it usually will be entrained in the gases. For ore roasting or refining (including chlorination of titanium containing ore), the particulate material which is entrained usually has a particle size of less than about 70 microns. For combustion of carbonaceous materials such as coal, the particulate material which becomes entrained also typically has a particle size of less than about 70 microns.

The material which is susceptible to entrainment can be that generated by degradation or attrition in the fluidized bed of material having a particle size in excess of about 70 microns. In such case, the material so generated will generally be entrained in the gases exiting the bed and can be removed therefrom by a cyclone or other separator and recycled to the bed. Also, of course, material in the feed to the bed with a particle size of less than about 70 microns is susceptible to entrainment.

Typical conditions for fluidized bed chlorination of titanium containing material are as follows: reaction temperature of about 900°–1300° C., pressure of about 1.5–3 atmospheres, reactor size of about 6–25 feet in diameter with multiple chlorine jets in the base, reactor superficial velocity of about 0.5–1.5 feet per second, and a settled bed depth of about 6–25 feet. Typically, the titanium containing material initially fed has a particle size of about 70–800 microns and the coke initially fed has a particle size of about 300–3000 microns.

The titanium containing material can be any suitable titanium-bearing source material such as titanium containing ores including rutile, ilmenite, or anatase ore; beneficiates thereof; titanium containing by-products or slags; and mixtures thereof.

The coke which is suitable for use in the fluidized bed process for chlorinating titanium containing material is any carbonaceous material which has been subjected to a coking process. Preferred is coke or calcined coke which is derived from petroleum or coal, or mixtures of such cokes.

Preferably, at least part of the coke and/or titanium containing material used in this invention should have a fine particle size, i.e., a diameter of less than about 70, more preferably, less than about 60, and most preferably less than about 50 microns. It should be understood that the source of such fine particle coke and/or material can be that generated in the process by degradation or attrition of particles larger than about 70 microns.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosures of all applications, patents and publications cited above are hereby incorporated by reference.

BRIEF DESCRIPTION OF THE DRAWING

Various other objects, features and attendant advantages of the present invention will be more fully appreciated as the same becomes better understood when considered in conjunction with the accompanying drawing, in which like reference characters designate the same or similar parts throughout the several views, and wherein.

DETAILED DESCRIPTION OF THE DRAWING

Figure 1:
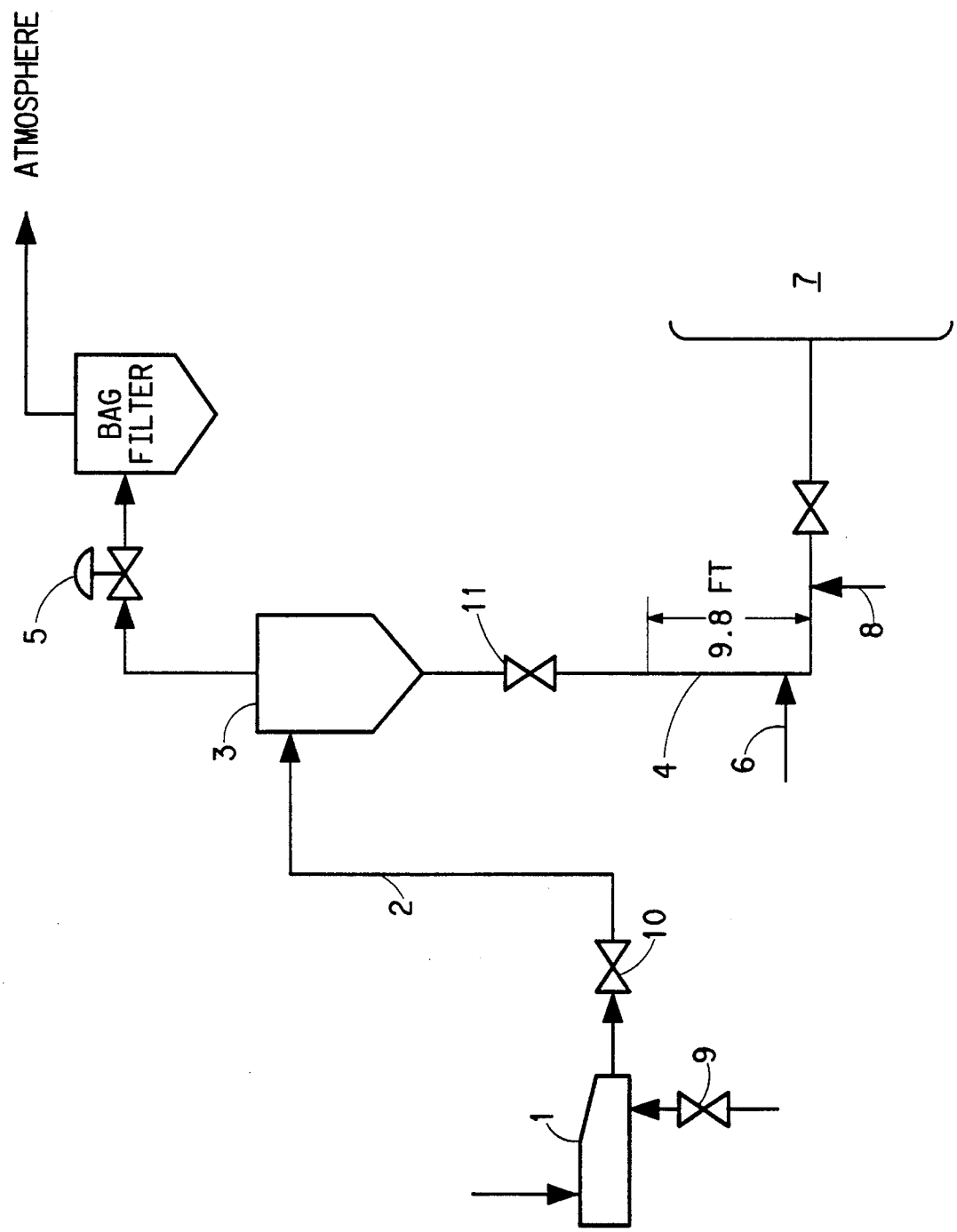
FIG. 1 is a schematic illustration of an embodiment of the invention.

A solids feed system to a fluidized bed reactor was operated as shown schematically in FIG. 1, in which a Fuller-Kinyon pressure feed pump (1) as used to convey titanium-bearing ore and coke through line (2) to a cyclone (3) in which gas and solids are separated into two streams, an exit gas stream and a gravity stream of solids through a standpipe (4). A back pressure control valve (5) is used to control the pressure of the exit gas and thus the effective hydrostatic head of the solids column in the standpipe. The solids in the standpipe are fluidized with nitrogen inserted at point (6). The solids from the standpipe are fed to the fluidized bed reactor (7) through an "L" valve, or pipe with a 90 degree bend, to the horizontal leg of which further nitrogen (e.g., 100 lb/hr) is added at point (8) to optimize solids flow.

The first step in operation is to establish nitrogen flows at points (6) and (8) of 50 lb/hr and 100 lb/hr, respectively. Valve (9) is then opened to supply nitrogen at 2000 lb/hr for solids conveying, and valves (10) and (11) are successively opened, while the automatic back pressure control valve (5) is kept closed. At this start-up stage in the operation all the nitrogen flows into the fluidized bed reactor (7) without any solids feed.

The solids feed comprising titanium-bearing ore and coke is then slowly added, up to the desired rate of 77,500 lb/hr. The total stream of nitrogen and solids is now conveyed into the reactor. The back pressure control valve (5) is gradually opened until a solids level (e.g., about 9.8 ft.) appears in the standpipe (4) and the pressure at the entrance to the back pressure control valve (5) is about 3.5 lb. per sq. inch higher than that at the inlet to the reactor (7). This positive pressure minimizes back flow from the reactor and is the equivalent of about an additional 40 ft. of solids in the standpipe (4).

The preceding examples can be repeated with similar success by substituting the generically or specifically described reactant and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A system for feeding particulate solids to a fluidized bed reactor comprising:
    (a) a solids transport device for transporting solids with inert gas at elevated pressure;
    (b) a transport line for conveying inert gas and entrained solids, said transport line connecting said solids transport device to a cyclone wherein gas and solids are separated;
    (c) gas conduit means connected to said cyclone for removing gas;
    (d) solids discharge means connected to said cyclone for passing solids to an essentially vertical standpipe, and inlet means provided in said standpipe for introducing inert gas into said standpipe at one or more locations to fluidize solids;
    (e) valve means for controlling the pressure in said conduit means for removing gas thereby controlling the effective hydrostatic head of a solids column in said standpipe;
    (f) a feed conduit without valve means connecting said standpipe to a fluidize bed reactor for feeding solids in a dense phase directly to said reactor said feed conduit having a bend which is greater than the angle of repose of the particulate solids being transported;
    (g) pressure sensors for measuring the pressure directly upstream of said valve means and the pressure in said reactor; and
    (h) a differential pressure controller for controlling said valve means, said controller being connected to said pressure sensors.

2. A system according to claim 1, wherein said bend is a J bend or a U bend.

3. A system according to claim 1, wherein said bend is an L bend.

4. A system according to any one of claims 1, 2 or 3 wherein said standpipe is of a height capable of retaining a solids column of about 10 feet.

* * * * *